March 4, 1930. M. HAZEN 1,749,342
METHOD AND MACHINE FOR FORMING, BENDING, AND CUTTING OFF METAL STRIPS
Filed May 25, 1927 6 Sheets-Sheet 2

INVENTOR.
Morris Hazen
BY James N. Ramsey
ATTORNEY.

March 4, 1930.   M. HAZEN   1,749,342
METHOD AND MACHINE FOR FORMING, BENDING, AND CUTTING OFF METAL STRIPS
Filed May 25, 1927   6 Sheets-Sheet 3
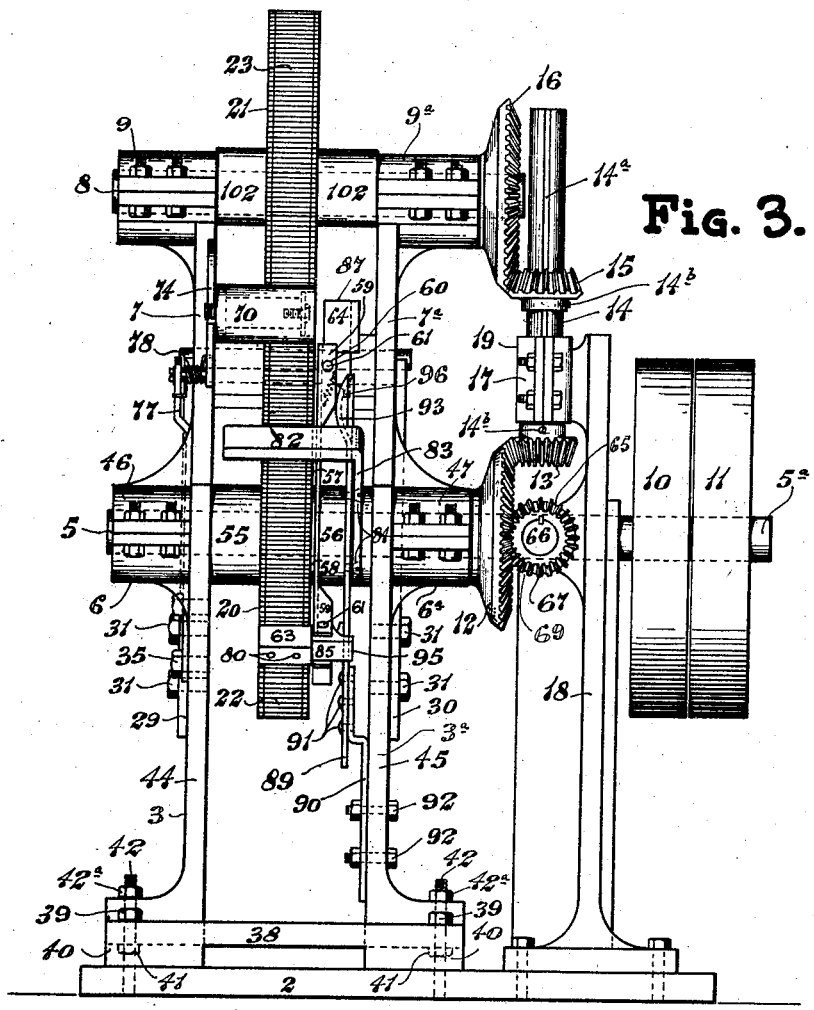
Fig. 3.
Fig. 4.
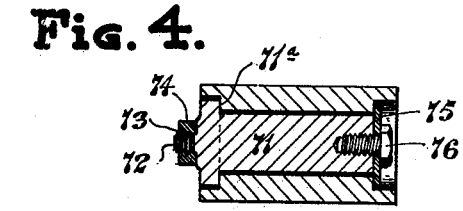
INVENTOR.
Morris Hazen
BY James N. Ramsey
ATTORNEY.

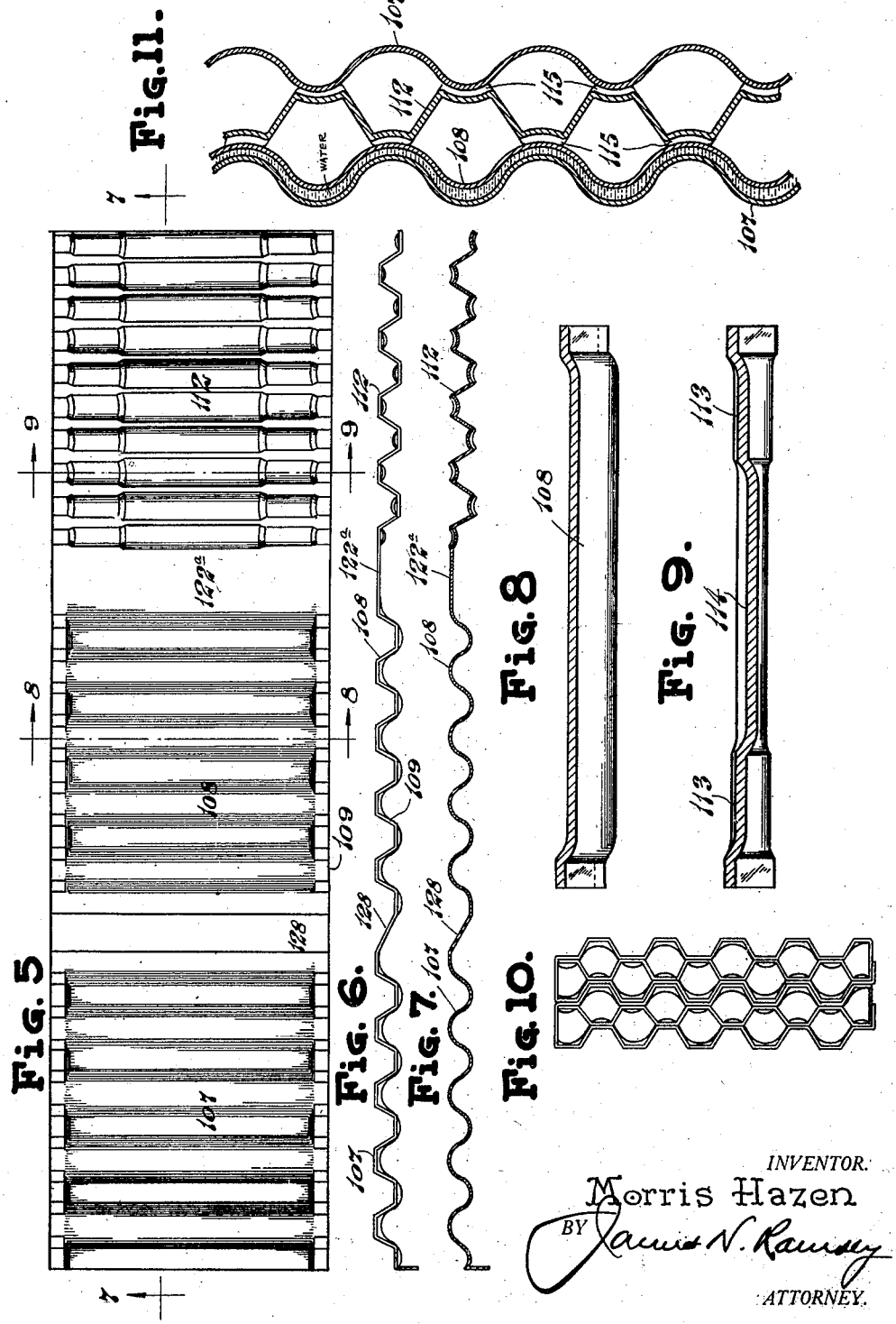

March 4, 1930. M. HAZEN 1,749,342
METHOD AND MACHINE FOR FORMING, BENDING, AND CUTTING OFF METAL STRIPS
Filed May 25, 1927 6 Sheets-Sheet 5
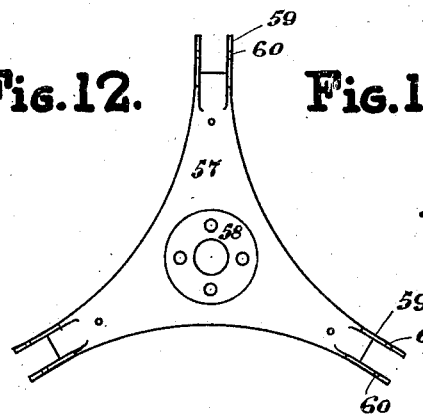
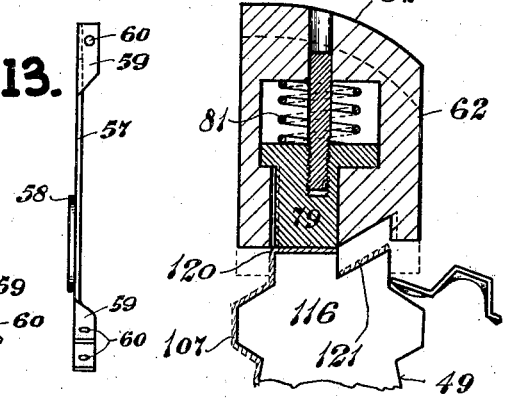
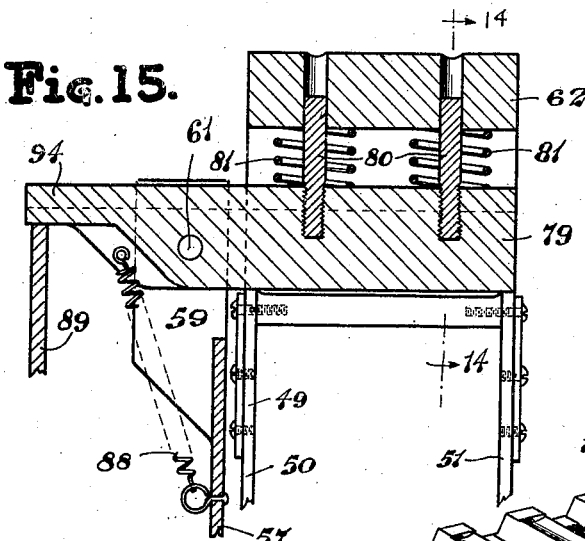
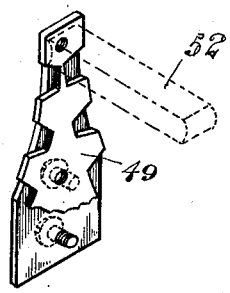
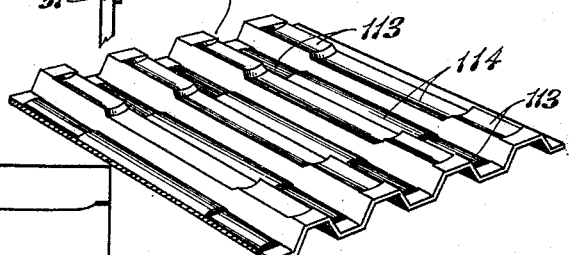
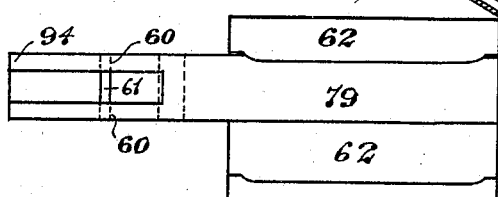
INVENTOR.
Morris Hazen
BY James N. Ramsey
ATTORNEY.

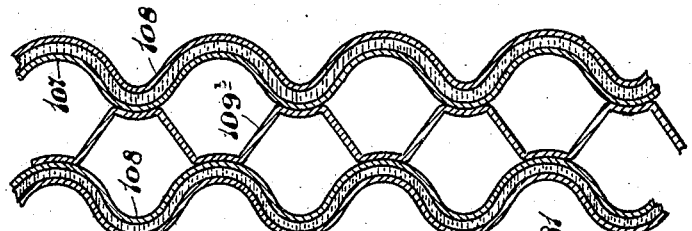
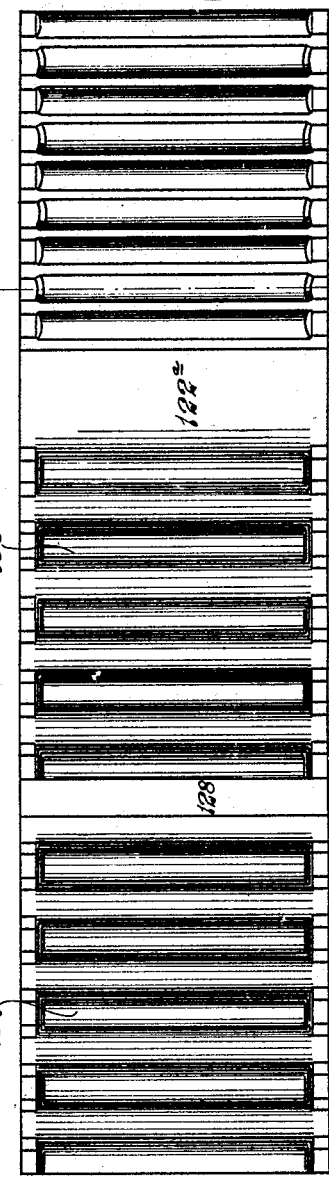
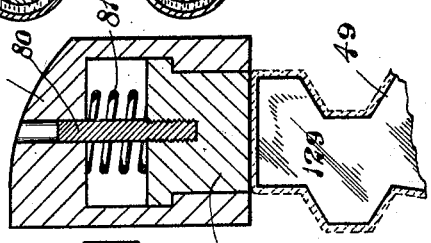
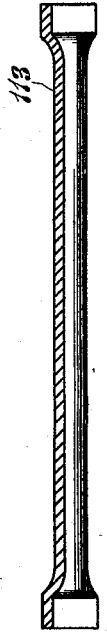

Patented Mar. 4, 1930

1,749,342

UNITED STATES PATENT OFFICE

MORRIS HAZEN, OF CINCINNATI, OHIO

METHOD AND MACHINE FOR FORMING, BENDING, AND CUTTING OFF METAL STRIPS

Application filed May 25, 1927. Serial No. 194,061.

This invention relates to a machine for completely forming individual units or sections for use in the manufacture of radiators for internal combustion engines; or more specifically for forming a metal strip into three integral sections and bending them with one between the other two to form a complete unit of a radiator core.

This application is a continuation in part of my copending application Serial No. 122,828, filed July 16, 1926 for improvements in machines for forming metal strips and a method of making sections for radiator cores which has matured into Patent No. 1,704,381, dated March 5, 1929.

The objects of this invention are to produce a machine of this character whereby such units or sections may be manufactured efficiently, accurately, economically and in a minimum amount of time for such work.

Another object of this invention is to produce a machine of this character which forms a corrugated metal strip by passing a plain strip through a set of corrugating rollers, then bending said formed or corrugated strip upon itself to form one section or unit of a radiator for internal combustion engines.

Other objects and advantages will be apparent as the description proceeds.

The invention consists in the provision of a machine for forming, bending and cutting metal strips which comprises, generally, means for applying pressure on opposite faces of the metal strip, such as coacting grooved or toothed rollers which also act to advance the strip; means for driving said rollers; means for guiding said strip into said rollers, as it is drawn from the roll of stock; means whereby said formed strip is bent upon itself by a plurality of dies, and cutting means actuated in timed relation with the operation of the other parts to cut the formed and bent strip into complete sections or units.

The invention further consists in the construction, combination and arrangement of parts and in the method, as hereinafter specified and claimed.

In the drawings:

Fig. 3 is a front end elevation of the machine;

Fig. 4 is a horizontal section of the stock retaining roller taken on a plane corresponding to line 4—4 of Fig. 1;

Fig. 5 is a plan view of the formed metal strip before being bent upon itself;

Fig. 6 is an edge view thereof;

Fig. 7 is a longitudinal vertical section taken on line 7—7 of Fig. 5;

Fig. 8 is an enlarged cross-section taken on line 8—8 of Fig. 5;

Fig. 9 is an enlarged cross-section taken on line 9—9 of Fig. 5;

Fig. 10 is an end elevational view showing two strips bent upon themselves forming two radiator sections or units in assembled position;

Fig. 11 is a fragmentary section of Fig. 10 on an enlarged scale, showing clearly the water passages and air passages;

Fig. 12 is a detailed view of the die carrying arm;

Fig. 13 is an edge view thereof;

Fig. 14 is a transverse cross-section of the cutting die on the line 14—14 of Fig. 15;

Fig. 15 is a longitudinal cross-section thereof;

Fig. 16 is a fragmentary view of the bending spider showing one of the outside supporting plates;

Fig. 17 is a bottom view of the cutting die;

Fig. 18 is a perspective view of a portion of the formed strip constituting the central portion or third of the completed unit;

Fig. 19 is an edge elevational view of one complete section or unit of a radiator core as produced by the machine;

Fig. 20 shows a modified form of the strip shown in Fig. 5 whereby the vertical air passages 115 are elminiated;

Fig. 21 is an edge elevational view thereof;

Fig. 22 is an enlarged transverse cross-section taken on a plane corresponding to line 22—22 of Fig. 20;

Fig. 23 is an enlarged fragmentary section similar to that shown in Fig. 11 but showing the modified construction of portion 112 whereby the air spaces 115 are eliminated; and Fig. 24 is an enlarged transverse section of one of the bending dies.

Figure 1:
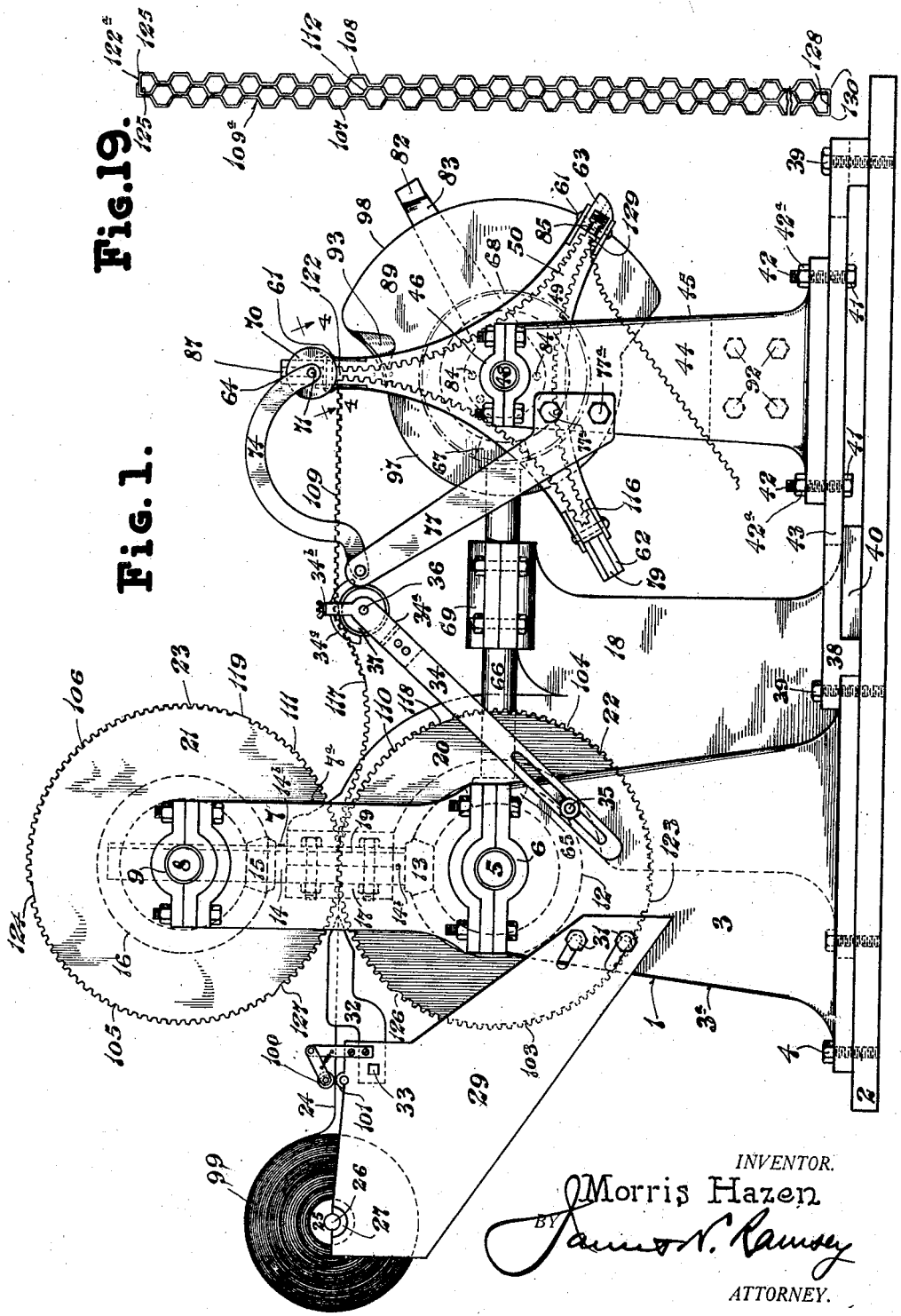
Fig. 1 is a side elevational view of the machine or apparatus for carrying into effect the method of forming and bending the metal strip.

In the embodiment of my invention as illustrated and which shows a preferred construction I provide a metal strip forming machine 1 having base 2 upon which roller supports 3 and 3ª are securely fixed in spaced apart relation with one another as by bolts 4. Extending transversely of roller supports 3 and 3ª is main driving shaft 5 mounted in journals 6 and 6ª, respectively, the lower parts of which are formed integral with said supports 3 and 3ª. The upper parts of said journals 6 and 6ª, respectively, are formed by the lower extremity of upright supports 7 and 7ª. Extending transversely of supports 7 and 7ª, respectively, is shaft 8 mounted in journals 9 and 9ª.

Fixed to outer end 5ª of driving shaft 5 is pulley wheel 10, and rotatably mounted on said end 5ª of driving shaft 5 is pulley wheel 11. Said pulley wheel 10 is driven by a belt (not shown) which, in turn, imparts motion to driving shaft 5. Should it become necessary to stop the motion of driving shaft 5 the belt may be shifted to pulley wheel 11 (which rotates freely on shaft 5) by the usual and well-known methods.

Gear 12, keyed to driving shaft 5, is in meshing engagement with pinion 13 fixed to the lower end of shaft 14. Fixed to the upper end of shaft 14 is pinion 15 which is in meshing engagement with gear 16, the latter being keyed to shaft 8. Said shaft 14 carrying pinions 13 and 15, respectively, is rotatably supported within bearing 17, half of which is formed integrally with support 18, the other half comprising bearing cap 19. Said pinions are prevented from rotating on shaft 14 as by key and keyway 14ª. Said pinions are also held by set screws 14ᵇ.

Keyed to shafts 5 and 8, respectively, are strip forming rollers 20 and 21, respectively, having outer cooperating die faces 22 and 23 adapted to intermesh for the purpose of forming strip 24, as hereinafter fully explained and shown in Figs. 5, 6 and 7, respectively.

The strip 24 is fed between forming rollers 20 and 21, as by being mounted on spool 25 which is mounted on shaft 26 having its ends mounted in bearings at 27 and 28, respectively, in supporting arms 29 and 30 adjustably fixed to roller supports 3 as by bolts 31.

Figure 2:
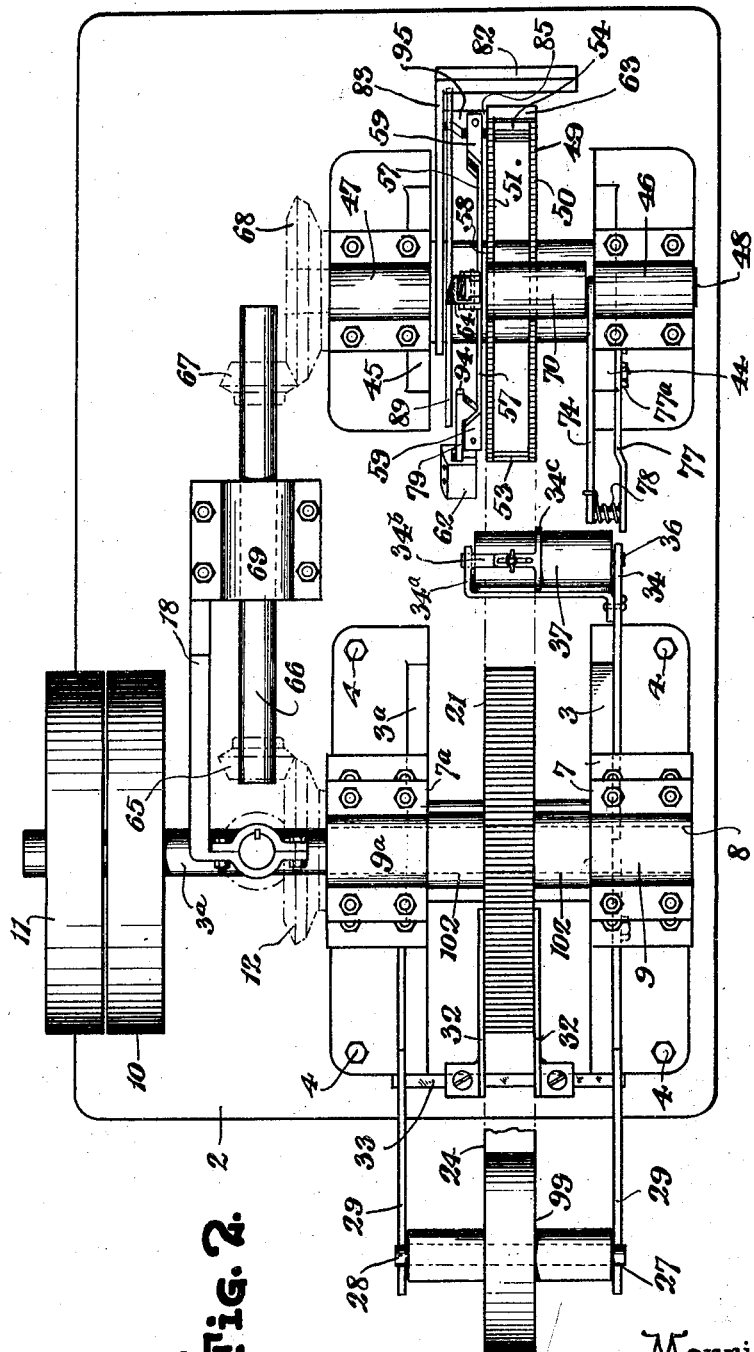
Fig. 2 is a plan view thereof, parts being broken away and parts shown by dotted lines.

To facilitate in maintaining strip 24 in proper position to be received between the forming rollers 20 and 21, respectively, I provide adjustable guide plates 32 movably mounted upon bar 33 which is supported by arms 29 and 30, as clearly shown in Figs. 1 and 2.

Arm 34 adjustably fixed to roller support 3 by bolt and nut 35 is provided at its upper end with laterally extending bracket 34ª which bracket and arm support shaft 36 upon which roller 37 is rotatably mounted.

Said bracket 34ª is also provided with extended arm 34ᵇ which slidably supports forked guide plate 34ᶜ.

Auxiliary base 38 is mounted upon base 2 and is fixed thereto as by bolts 39, as clearly shown in Fig. 1. The central part of said auxiliary base 38 is cut away at 40 to provide clearance for heads 41 of bolts 42. Said bolts 42 fit within slots 43 in said auxiliary base 38 whereby standards 44 and 45 mounted on said base may be moved longitudinally relative therewith for the purpose of adjustment as described later herein.

Said standards 44 and 45, respectively, movably mounted upon auxiliary base 38, are spaced apart from each other and are provided at their upper ends with bearings 46 and 47, respectively, which bearings rotatably receive shaft 48. Bending spider 49 is securely keyed to shaft 48 and comprises side plates 50 and 51, the edges of which are formed to receive the strip after it has passed through the forming rollers 20 and 21, respectively, and which are tied together by bars 52, 53 and 54, respectively. To insure proper alignment of said spider 49 with forming rollers 20 and 21, I provide spacing collars 55 and 56, respectively, as clearly shown in Fig. 3.

Triangular arm 57, shown in Figs. 12 and 13 is spaced apart from bending spider 49 by washer 58 and is securely fixed to said spider by bolts or rivets, as desired.

The outer ends of said triangular arm are provided with ears 59 bent at right angles thereto which have holes 60 for the purpose of receiving pivot pins 61 on which pins the cutting die 62, bending die 63 and bending die 64 pivot.

In order that the bending spider 49 be turned or rotated simultaneously with forming rollers 20 and 21, respectively, I provide pinion 65 fixed to horizontal shaft 66, which is in meshing engagement with gear 12 fixed upon driving shaft 5 and pinion 67 fixed to the other end of said shaft 66 and which is in meshing engagement with gear 68 fixed to shaft 48, as clearly shown in Figs. 1, 2 and 3, respectively. Said shaft 66 is rotatably mounted in bearing 69 which is supported by support 18 (see Figs. 1, 2 or 3).

After the strip 24 has passed through forming rollers 20 and 21, respectively, whereupon it is formed to the shape shown in Fig. 5 and is passed over roller 37 onto bending spider 49, I provide strip retaining roller 70 which is adapted to press and hold said formed strip upon said spider 49. Strip retaining roller 70 is rotatably mounted on axle 71, the threaded neck 72 of which is received by threaded hole 73 of swinging arm 74 (see Fig. 4). Said roller 70 is rotatably held upon axle 71, as by shoulder 71ª of said axle, washer 75 and bolt 76, as illustrated in Fig. 4. Swinging arm 74 is pivotally connected to stationary arm 77, as shown in Fig. 3 and coil spring 78 is so arranged between said swinging arm 74 and stationary arm 77, respectively, as to provide downward pressure on arm 74 which, in turn, applies downward pressure to roller 70. Stationary arm 77 is rigidly attached to standard 44 by bolts 77ª (Fig. 1).

The cutting die is shown in Figs. 14 and 15. In Fig. 15 it will be clearly apparent that pivoted member 79, mounted on one of the pivot pins 61 between two of the ears 59 carries cutting die 62. Said cutting die 62 is movably supported upon pins 80 which are fixedly secured to pivoted member 79 and coil springs 81 encircling said pins 80 normally hold said cutting die 62 in the open position. The top 62ª of said cutting die 62 is tapered so that die closing bar 82, integral with arm 83 may close said cutting die at the proper time. The arm 83 is rigidly attached to cam 89 by screws 84. Bending die 63 is movably mounted upon pivoted member 85, which member is similar to member 79 and pivots on one of the pivot pins 61. Said bending die 63 is also closed at the proper time by die closing bar 82. Bending die 64 is movably mounted upon pivoted member 87 which member is pivoted on one of the pivot pins 61 supported by one set of ears 59 integral with triangular arm 57.

Said pivoted members 79, 85 and 87, respectively, are normally held in open position as by springs 88.

Cam 89 is rigidly attached to bracket 90 by rivets or bolts 91, said bracket being attached to the inner walls of standard 45, as clearly shown in Fig. 3 by bolts 92.

As shown in Fig. 1, cam 89 is provided with inwardly curved portion 93 which acts as a "pick up" for tails 94, 95 and 96 of pivoted members 79, 85 and 87, respectively. Face 97 of cam 89 is of a smaller radius than face 98 of said cam and at the proper time curved portion 93 picks up tails 94, 95 and 96, respectively, in rotation and brings them into contact with said face 98, which holds said pivoted members 79, 85 and 87, respectively, in closed position.

As strip 24 is drawn from stock roll 99, small guide rollers 100 and 101 mounted upon supporting arms 29 and 30, respectively, help to guide said strip into forming rollers 20 and 21.

To centrally dispose forming rollers 20 and 21 between roller supports 3 and 3ª and upright supports 7 and 7ª, respectively, I provide spacing collars 102. Should it be desired to form a wider or narrower strip, all that is necessary is to remove said forming rollers 20 and 21 and spacing collars 102 and replace smaller or wider forming rollers and narrower or wider spacing collars, as the case may be.

Should it be desired to form a different length strip than shown, all that is necessary is to replace the forming rollers by rollers of the desired length, replace the bending spider 49 with a suitable size and move standards 44 and 45 towards or from roller supports 3 and 3ª, respectively, as the case may be, by loosening nuts 42ª on bolts 42, moving said standards 44 and 45 and then tightening said nuts again.

The outer cooperating die faces 22 and 23 of forming rollers 20 and 21, respectively, are divided into three forming portions, two of which are alike and the third one different, so that when strip 24 is formed (and before being bent and cut as shown in Fig. 19) it looks as shown in Figs. 5 and 6, respectively.

Portions 103 and 104, of die face 22, respectively, of forming roller 20 are adapted to mesh with portions 105 and 106 of die face 23 of forming roller 21, thereby forming portions 107 and 108, respectively, of formed strip 109, as shown in Figs. 5 and 6, respectively.

Portion 110 of die face 22 is adapted to mesh or cooperate with portion 111 of die face 23 whereby portion 112 of formed strip 109 is provided with a series of recesses 113 and 114, said recesses 114 being deeper than recesses 113 and forming vertical air spaces 115 between said portions 112 and portions 107 and 108, respectively, as clearly illustrated in the sectional view Fig. 11.

Referring now to the operation of the machine, assume that stock roll 99 is in its proper place and strip 24 has been inserted through guide rollers 100 and 101 between guide plates 32 and into engagement with forming rollers 20 and 21, respectively.

Then assume that power is applied to driven pulley 10, which in turn, rotates shaft 5 and forming roller 20 in a clockwise or forward direction. The rotation of shaft 5 causes forming roller 21 to be rotated in an anticlockwise or backward direction through gear 12, pinion 13, shaft 14, pinion 15, gear 16 and shaft 8, respectively.

It will, therefore, be clearly apparent that plain strip 24, after passing or being drawn through forming rollers 20 and 21, respectively, is formed to the shape shown in Figs. 5 and 6, respectively, whereupon it rides over roller 37, under strip retaining roller 70, and onto bending spider 49. Said bending spider 49 is so timed and arranged relative to forming rollers 20 and 21, respectively, that cutting end 116 (Fig. 14) is adapted to register with blank space 117 formed by recess 118 of forming roller 20 and projection 119 of forming roller 21 (Fig. 1). Said blank space 117 is bent at 120 (Fig. 14) and part 121 is cut out by cutting die 62. When said cutting die 62 clears face 98 of cam 89 the formed and bent strip 109ª is released from the machine in the form shown in Fig. 19.

End 122 of bending spider 49 receives blank 122ª formed in strip 109 by projection 123 of forming roller 20 and recess 124 of forming roller 21, whereupon said blank portion 122ª is bent at 125 by bending die 64, as shown in Fig. 19.

Portions 126 and 127 of forming rollers 20 and 21, respectively, form the inclined blank 128 in formed strip 109 which is received by end 129 of bending spider 49 and bent at 130, as shown in Fig. 19.

Should it be desired to change the length of the formed strip 109, it is necessary to replace strip forming rollers 20 and 21, respectively, with larger rollers. In order to do this, all that is necessary is to replace upright supports 7 and 7ª, respectively, by similar longer supports, whereupon gear 16 and shaft 8 will be at a greater distance from main driving shaft 5, which change in distance is taken care of by pinion 15 being slid upwardly on the extended portion of shaft 14, whereupon set screw 14ᵇ is again tightened, thereby retaining said pinion in meshing engagement with said gear 16 in the usual manner. It will be understood, however, that the bending spider 49 must also be replaced by a larger one to take care of the increased length of the strip formed by the larger forming rollers and also triangular arm 57 must be replaced by a larger arm of substantially the same shape in order to insure the bending and cutting dies operating in a satisfactory manner upon said formed strip, as before described. In changing the length of the strip, standards 44 must also be moved at a greater distance relative to roller supports 3 and 3ª, which movement is taken care of by loosening nuts 42ª upon bolts 42 by sliding said standards horizontally upon auxiliary base 38 to the desired adjusted position and then tightening said nuts 42ª in order to insure rigid attachment of said standards with said auxiliary base. After standards 44 have been moved relative to roller supports 33 and 33ª, respectively, pinion 67 is moved a corresponding distance upon horizontal shaft 66, thereby maintaining its proper meshing engagement with gear 68. It will also be noticed that strip retaining roller 70 rolls along the outer edges of bending spider 49, thereby insuring the proper registry of blank space 117.

While I have shown and described a particular construction, as for example, the forming rollers 20 and 21, respectively, may be removed and replaced by a modified pair of forming rollers, thus so equipping the machine as to produce formed strip 109ᵇ, shown in Figs. 20, 21, 22 and 23, whereby the recesses 114 are eliminated, thereby omitting the vertical air spaces 115, as shown in the sectional view, Fig. 23.

It is obvious that those skilled in the art may vary the details of the method, as well as the details of construction without departing from the spirit of the invention and, therefore, I do not wish to be limited to the above disclosure except as may be required by the claims.

What I claim is:

1. A machine for carrying out the described method of forming radiator core sections, comprising a pair of corrugating members which are adapted to receive a strip of flat metal between them and having three integral cooperating die faces whereby said strip is corrugated, means for guiding said strip between said corrugating die members, means for bending said corrugated strip upon itself, means for simultaneously driving said corrugating and bending die members in unison, and cutting means actuated in time relation with the operations of the forming and bending dies to cut the completed formed and bent strip, thereby finishing one complete section or unit of a radiator core.

2. A continuous strip forming machine of the character described, comprising a base, a pair of forming advancing die members rotatably mounted upon said base, a triangular bending member rotatably mounted upon said base, means for simultaneously driving said bending and said forming die members in unison, a plurality of dies for bending and cutting the formed strip which are located adjacent to said bending member, and movable therewith, means for successively closing said dies into operative position, means for normally holding said dies open in operative position, and means for supporting and guiding said strip between said forming dies.

3. A continuous strip forming machine comprising a base, standards mounted on said base, uprights on said standard, a pair of forming advancing die members rotatably mounted between said uprights, an auxiliary base mounted upon said first base, standards mounted on said auxiliary base, a triangular bending member rotatably mounted between said standards, means for simultaneously driving said bending and said forming members in unison, a plurality of dies for bending and cutting the formed strip which are located adjacent to said bending member and movable therewith, means for successively closing said dies into operative position, means for normally holding said dies open in operative position, and means for guiding said formed strip upon said triangular bending member.

4. A machine for forming, bending and cutting a metal strip so as to form one complete section of a radiator core from a single strip of flat metal, comprising a pair of corrugating members which are adapted to receive a strip of flat metal between them and having three integral cooperating die faces whereby said strip is corrugated, a triangular member for receiving said corrugated strip, die members for bending said corrugated strip upon itself, means for simultaneously driving said corrugating and triangular members in unison, and cutting means for automatically cutting said corrugated strip after it has been bent upon itself by said die members, thereby producing a complete radiator core section made of one continuous strip of flat metal.

5. A machine for continuously forming radiator core sections, comprising a pair of forming die members adapted to receive a strip of flat metal between them and having three integral cooperating die faces two of which are alike and one different, said forming dies being provided with end portions and intermediate portions out of the plane of said end portions whereby when said strip is formed and bent with said different section between those which are alike vertical air spaces are formed therein between said sections, and vertical water grooves on the outer walls of said sections.

6. A machine as claimed in claim 1 whereby said machine is adjustable for the formation of different length and width of core sections.

7. A machine for continuously forming radiator core sections comprising a pair of forming die members adapted to receive a strip of flat metal between them and having three integral cooperating die faces two of which are alike and one different whereby said strip is formed, die members, a triangular member upon which said die members are adapted to bend said formed strip at spaced points, and means to hold said formed strip in proper engagement with said triangular member.

8. A machine for continuously forming radiator core sections, comprising a pair of forming die members adapted to receive a strip of flat metal between them and having three integral cooperating die faces two of which are alike and one different, die members, one of which is a cutting and bending device while the others perform a bending and holding operation only, and a triangular bending spider upon which the metal strip is bent and cut by said dies.

9. A machine for continuously forming radiator core sections, comprising a pair of corrugating members adapted to receive a strip of flat metal between them and having three integral cooperating die faces two of which are alike and one different whereby said strip is formed, die members, one of which is a cutting and bending device while the others perform a bending and holding operation only, a triangular bending spider upon which the corrugated metal strip is bent and cut by said dies, and means to hold said corrugated strip in proper engagement with said triangular bending spider.

10. A machine for continuously forming radiator core sections, comprising a pair of corrugating members adapted to receive a strip of flat metal between them and having three integral cooperating die faces two of which are alike and one different whereby said strip is formed, die members, means for successively closing said die members, and means whereby said die members are normally held opened at pre-determined times.

11. A machine for continuously forming radiator core sections comprising a pair of corrugating members adapted to receive a strip of flat metal between them and having three integral cooperating die faces two of which are alike and one different, whereby said strip is formed, a triangular member for receiving said corrugated strip, die members adapted to bend and cut said formed strip upon said triangular member, means for simultaneously driving said bending and said forming members in unison, a cam, a die closing bar spaced apart adjacent said cam whereby said dies, are, respectively, brought into operative action relative to said corrugated strip, thereby producing a complete radiator core section, substantially as described.

12. A machine for producing radiator core sections comprising means for transversely corrugating a strip of flat metal into three integral sections two of which are alike and one different, means for bending said different section between the two which are alike, and means for cutting the corrugated and bent strip from the stock from which it is taken, thereby finishing one complete radiator core section.

13. A machine for forming metal strips comprising a pair of forming die members adapted to receive a strip of flat metal between them and having three integral cooperating die faces whereby said strip is formed, means for bending said formed strip upon itself, means for simultaneously driving said forming and bending members in unison, and means for adjusting said driving members to cooperate when different sizes of forming and bending dies are used.

14. The method of forming strips of sheet metal to produce the component elements of a radiator core which comprises the following steps performed upon a continuously-moving strip, namely, forming corrugations in said strips, then severing sections of equal lengths therefrom and simultaneously with said severing step, bending the adjacent severed end to a right angle to the longitudinal dimension of the strips.

15. The method of forming metal strips to produce the component elements of a radiator core section which comprises the following steps performed upon a continuously moving strip, namely, forming said strip in three integral portions one of said portions differing in shape from the other two, then simultaneously severing sections from said strip at spaced points and bending the respective adjacent ends at a right angle to the longitudinal axis of the strip.

16. The method of forming and bending metal strips to produce the component elements of radiator core sections which comprises the following steps performed on a continuously moving strip, namely, forming said strip into three integral sections, then simultaneously bending said formed strip to bring one of said sections between the other two and cutting off said formed and bent strip whereby a complete radiator core section is formed.

MORRIS HAZEN.